(12) United States Patent
Gong et al.

(10) Patent No.: US 10,570,815 B2
(45) Date of Patent: Feb. 25, 2020

(54) WASTEGATE VALVE ASSEMBLY WITH BIASING MEMBERS

(71) Applicant: HONEYWELL INTERNATIONAL INC., Morris Plains, NJ (US)

(72) Inventors: John Gong, Shanghai (CN); Henry Guo, Shanghai (CN); Judy Wang, Shanghai (CN); XiaoLei Jin, Shanghai (CN); Xinlei Qiu, Shanghai (CN)

(73) Assignee: GARRETT TRANSPORTATION I INC., Torrance, CA (US)

(*) Notice: Subject to any disclaimer, the term of this patent is extended or adjusted under 35 U.S.C. 154(b) by 85 days.

(21) Appl. No.: 15/788,491

(22) Filed: Oct. 19, 2017

(65) Prior Publication Data
US 2019/0120129 A1  Apr. 25, 2019

(51) Int. Cl.
*F02B 37/18* (2006.01)
*F16K 1/20* (2006.01)
*F16K 17/04* (2006.01)

(52) U.S. Cl.
CPC .......... *F02B 37/186* (2013.01); *F02B 37/183* (2013.01); *F16K 1/20* (2013.01); *F16K 17/0433* (2013.01); *Y02T 10/144* (2013.01)

(58) Field of Classification Search
CPC ......... F16K 1/20–2092; F16K 17/0433; F16K 39/02; F16K 39/022; F16B 5/0241; F02B 37/18–186; F01D 17/10–105
See application file for complete search history.

(56) References Cited

U.S. PATENT DOCUMENTS

| | | |
|---|---|---|
| 9,175,578 B2 | 11/2015 | Igarashi et al. |
| 9,249,721 B2 | 2/2016 | Micanek et al. |
| 2007/0119170 A1* | 5/2007 | Masson .................. F01D 17/105 60/600 |
| 2012/0055154 A1 | 3/2012 | Ebert |
| 2013/0139502 A1 | 6/2013 | Chu |
| 2013/0189072 A1 | 7/2013 | Wade |
| 2014/0150424 A1 | 6/2014 | Eden et al. |

(Continued)

FOREIGN PATENT DOCUMENTS

| | | |
|---|---|---|
| DE | 199416775 U1 | 10/1994 |
| DE | 102010043147 A1 | 10/2011 |

(Continued)

OTHER PUBLICATIONS

European Patent and Trademark Office, Extended European Search Report for Application No. EP18200391.3, dated Jan. 11, 2019.

*Primary Examiner* — Laert Dounis
(74) *Attorney, Agent, or Firm* — Lorenz & Kopf, LLP

(57) ABSTRACT

A turbocharger system includes a wastegate with a bypass passage and a valve assembly. The valve assembly includes a poppet with an axis. The valve assembly also includes an arm that is attached to the poppet and that supports movement of the poppet between a closed position and an open position. Additionally, the valve assembly includes a plurality of biasing members that are disposed within a joint between the poppet and the arm. The plurality of biasing members provides a biasing force directed in a radial direction relative to the axis. The plurality of biasing members is disposed substantially symmetrically with respect to a first radial line of symmetry and a second radial line of symmetry.

17 Claims, 3 Drawing Sheets

(56) References Cited

U.S. PATENT DOCUMENTS

| | | |
|---|---|---|
| 2014/0169946 A1 | 6/2014 | Stilgenbauer et al. |
| 2014/0290240 A1 | 10/2014 | Fauconnier et al. |
| 2014/0321986 A1 | 10/2014 | Takahashi et al. |
| 2014/0345273 A1 | 11/2014 | Yamaguchi et al. |
| 2014/0366530 A1* | 12/2014 | Murayama ............ F02B 37/183 |
| | | 60/602 |
| 2015/0118027 A1 | 4/2015 | Zieboli et al. |
| 2015/0132103 A1 | 5/2015 | Ellenberger |
| 2015/0147162 A1 | 5/2015 | Stilgenbauer et al. |
| 2015/0247448 A1 | 9/2015 | Micanek et al. |
| 2016/0341112 A1* | 11/2016 | Goeckelmann ....... F02B 37/186 |
| 2017/0145909 A1* | 5/2017 | Huh ........................ F02B 37/18 |

FOREIGN PATENT DOCUMENTS

| | | | |
|---|---|---|---|
| DE | 102010055382 A1 * | 6/2012 | ........... F01D 17/105 |
| DE | 102010055382 A1 | 6/2012 | |
| DE | 102011007417 A1 | 10/2012 | |
| DE | 102011076361 A1 | 11/2012 | |
| DE | 102011079573 A1 | 1/2013 | |
| DE | 102011088034 A1 | 6/2013 | |
| DE | 102012201011 A1 * | 7/2013 | ............ F02B 37/183 |
| DE | 102012216893 A1 | 4/2014 | |
| DE | 112013001949 T5 | 1/2015 | |
| EP | 2574754 A2 | 4/2013 | |
| EP | 2574754 A8 | 11/2013 | |
| EP | 2574754 A3 | 5/2014 | |
| EP | 2954182 A1 | 12/2015 | |
| JP | 2015094283 A | 5/2015 | |
| JP | 2015197068 A | 11/2015 | |
| WO | 2007064551 A1 | 7/2007 | |
| WO | 2013087182 A2 | 6/2013 | |
| WO | 2013087182 A3 | 8/2013 | |
| WO | 2014187651 A1 | 11/2013 | |
| WO | 2014171239 A1 | 10/2014 | |
| WO | WO-2018019589 A1 * | 2/2018 | ............ F02B 37/183 |
| WO | WO-2018145908 A1 * | 8/2018 | ............... F16K 1/20 |

* cited by examiner

WASTEGATE VALVE ASSEMBLY WITH BIASING MEMBERS

TECHNICAL FIELD

The present disclosure generally relates to a turbocharger system and, more particularly, relates to a turbocharger wastegate valve assembly with a dampener.

BACKGROUND

Some engine systems include one or more turbochargers. Typically, turbochargers include a turbine wheel and a compressor wheel mounted on a common shaft and carried within isolated turbine and compressor housings, respectively. The turbine wheel may be driven in rotation by exhaust gas output by the engine. This, in turn, rotates the compressor wheel for compressing air that is fed to the combustion chambers of the engine. Accordingly, the turbocharger may provide a performance boost and increased efficiency to the engine.

In some embodiments, the turbocharger may include a wastegate with a valve. When the valve is closed, substantially all of the exhaust gas may flow toward the turbine. Conversely, with the valve open, at least some of the exhaust gas may flow through the wastegate and bypass the turbine. The position of the valve may be controlled for maintaining high efficiency during different operating conditions.

Accordingly, it is desirable to provide a turbocharger system with an improved wastegate valve that is supported for controlled movement between a closed position and an open position. Also, it is desirable for the valve to operate with reduced levels of noise, vibration, etc. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger system is disclosed that includes a turbine section with a turbine wheel. The system also includes a downstream exhaust pipe with a downstream exhaust passage configured to receive exhaust gas from the turbine section. The system further includes a wastegate with a bypass passage and a valve assembly configured to regulate flow through the bypass passage. The valve assembly includes a poppet configured to move between a closed position and an open position. The poppet is configured to substantially close the bypass passage when in the closed position, and the poppet is configured to open the bypass passage when in the open position and allow exhaust gas to flow to the downstream exhaust passage. The poppet has an axis. The valve assembly also includes an arm that is attached to the poppet and that supports movement of the poppet between the closed position and the open position. Additionally, the valve assembly includes a plurality of biasing members that are disposed within a joint between the poppet and the arm. The plurality of biasing members provide a biasing force directed in a radial direction relative to the axis. The plurality of biasing members are disposed substantially symmetrically with respect to a first radial line of symmetry and a second radial line of symmetry.

In another embodiment, a turbocharger system is disclosed that includes a turbine section with a turbine wheel. The system also includes a downstream exhaust pipe with a downstream exhaust passage configured to receive exhaust gas from the turbine section. Furthermore, the system includes a wastegate with a bypass passage and a valve assembly configured to regulate flow through the bypass passage. The valve assembly includes a poppet configured to move between a closed position and an open position. The poppet is configured to substantially close the bypass passage when in the closed position, and the poppet is configured to open the bypass passage when in the open position and allow exhaust gas to flow to the downstream exhaust passage. The poppet has an axis. The valve assembly also includes an arm that is attached to the poppet and that supports movement of the poppet between the closed position and the open position. Moreover, the valve assembly includes a plurality of biasing members that are attached to the poppet. The plurality of biasing members provides a biasing force to the arm that is directed in a radial direction relative to the axis. The plurality of biasing members are spaced substantially evenly about the axis.

In a further embodiment, a turbocharger system is disclosed that includes a turbine section with a turbine wheel and a downstream exhaust pipe with a downstream exhaust passage configured to receive exhaust gas from the turbine section. The system also includes a wastegate with a bypass passage and a valve assembly configured to regulate flow through the bypass passage. The valve assembly includes a poppet configured to move between a closed position and an open position. The poppet is configured to substantially close the bypass passage when in the closed position, and the poppet is configured to open the bypass passage when in the open position and allow exhaust gas to flow to the downstream exhaust passage. The poppet has an axis. Also, the poppet includes a mandrel with a first pocket, and a second pocket. The valve assembly also includes an arm with a head that receives the mandrel and that frictionally engages the mandrel. The arm supports movement of the poppet between the closed position and the open position. The valve assembly further includes a first biasing member that is received within the first pocket and a second biasing member that is received within the second pocket. The first and second biasing members frictionally engage the arm and provide a biasing force to the arm that is directed in a radial direction relative to the axis, the plurality of biasing members being disposed substantially symmetrically with respect to a first radial line of symmetry and a second radial line of symmetry.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The present disclosure, in some embodiments, relates to a wastegate with a valve assembly for a turbocharger system. Certain features of the valve assembly may improve operation, prolong the operating life, improve manufacturability, and/or provide other benefits for the turbocharger system.

The valve assembly, in some embodiments, may include a poppet and an actuating arm that is attached to the poppet at a joint. The valve assembly may also include a plurality of biasing members that are disposed within the joint. The biasing members may provide a biasing force that is directed in a radial direction relative to the poppet to help secure the joint. The biasing members may be spaced apart about the periphery of the poppet. In some embodiments, the biasing members may be spaced substantially evenly about the periphery of the poppet. Also, the biasing members may be symmetrically disposed about the poppet. For example, in some embodiments, there may be at least two lines of symmetry for the arrangement of the biasing members about the poppet. Accordingly, the biasing forces provided by the biasing members may be substantially evenly distributed between the poppet and the actuating arm.

The biasing members may enhance frictional engagement within the joint between the poppet and the actuating arm. The frictional engagement may substantially prevent uncontrolled vibration, rattling, or other noise between the poppet and the arm. The biasing members may be selected and arranged to control the amount of frictional force at the joint, thus allowing the desired effect to be achieved.

The biasing members may also enable a small degree of movement of the poppet relative to the arm in the axial and/or radial directions. Accordingly, the biasing members may allow the poppet to change position relative to the arm, for example, to adapt to the different operating conditions of the turbocharger system and maintain high operating efficiency. For example, the poppet may self-adjust relative to the arm due to wear, due to thermal expansion, etc. Nevertheless, the biasing members may ensure that the poppet seals against a valve seat of the wastegate and prevents exhaust leakage.

Figure 1:
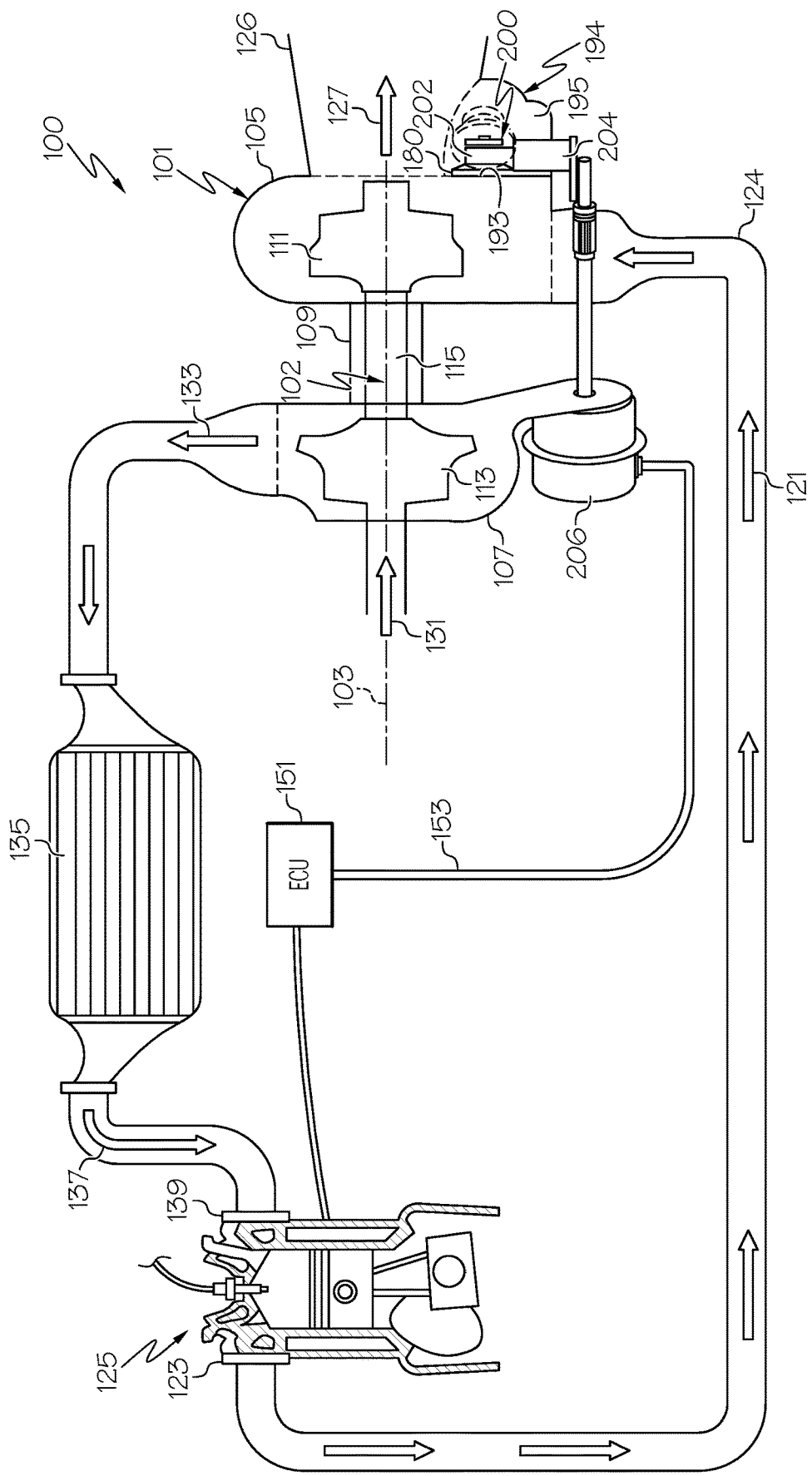
FIG. 1 is a schematic illustration of a turbocharger system configured according to example embodiments of the present disclosure.

Referring now to FIG. 1, an example turbocharger system 100 is shown that includes a turbocharger housing 101 and a rotor 102. The rotor 102 is configured to rotate within the turbocharger housing 101 about an axis 103 (axis of rotor rotation). The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis 103, through the bearing housing 109, to connect the turbine wheel 111 to the compressor wheel 113. Accordingly, the turbine wheel 111 and the compressor wheel 113 may rotate together as a unit about the axis 103.

The turbine housing 105 and the turbine wheel 111 may cooperate to form a turbine (i.e., turbine section, turbine stage) configured to circumferentially receive a high-pressure and high-temperature exhaust gas stream 121 delivered via an upstream pipe 124 from an exhaust manifold 123 of an internal combustion engine 125. The turbine wheel 111 (and thus the rotor 102) may be driven in rotation around the axis 103 by the exhaust gas stream 121. The turbine housing 105 may also be fluidly connected to a downstream exhaust pipe 126 or other downstream exhaust structure. The turbine housing 105 may release a downstream exhaust gas flow 127 into the exhaust pipe 126. The downstream exhaust gas flow 127 can be lower-pressure and lower-temperature compared to the exhaust gas stream 121.

The turbocharger system 100 may further include a wastegate 194 (i.e., a bypass structure). The wastegate 194 may be a hollow structure that defines a bypass passage 195 that extends therethrough. The wastegate 194 may be connected to the rotor housing 105 and/or the upstream exhaust pipe 124. The bypass passage 195 may include a valve opening 193. The valve opening 193 may fluidly connect the bypass passage 195 to the interior of the turbine housing 105, to the upstream exhaust pipe 124, or to another area upstream of the turbine wheel 111. The valve opening 193 may be defined by a valve seat 180 (e.g., a rim and a surrounding area of the valve opening 193).

Furthermore, the wastegate 194 may include a valve assembly 200. The valve assembly 200 may regulate flow through the bypass passage 195. More specifically, the valve assembly 200 may generally include a poppet 202, one or more actuating arms 204, and an actuator 206. The actuating arm(s) 204 may be rods or other linkages that operatively connect the poppet 202 to the actuator 206. The actuator 206 may be of any suitable type, such as an electric actuator, a hydraulic actuator, or a pneumatic actuator. The poppet 202 may be generally disc-shaped and may have a closed position and one or more open positions relative to the valve seat 180. The actuator 206 may actuate the poppet 202 (via the actuating arms 204) between the closed and open positions.

In the closed position, the poppet may seal against the valve seat 180 to substantially close off the valve opening 193 and prevent flow through the bypass passage 195. Conversely, in the open position (shown in phantom in FIG. 1), the poppet 202 may be spaced apart from the valve seat 180 to open the valve opening 193 and to allow exhaust flow through the bypass passage 195. As such, at least some of the exhaust gas stream 121 may bypass the turbine wheel 111 as it flows to the exhaust pipe 126. Accordingly, the position of the poppet 202 may be varied to change flow of the exhaust gas stream 121, for example, to control the rotational speed of the turbine wheel 111.

The compressor housing 107 and compressor wheel 113 cooperate to form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream 133 is characterized by an increased temperature, over that of the input air 131.

The air stream 133 may be channeled through an air cooler 135 (i.e., an intercooler), such as a convectively cooled charge air cooler. The air cooler 135 may be configured to dissipate heat from the air stream 133, increasing its density. The resulting cooled and pressurized air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

For example, the ECU 151 may control operation of the actuator 206 of the valve assembly 200. Accordingly, the ECU 151 may be used to control the position of the poppet 202 to thereby control flow through the wastegate 194, to control the rotational speed of the turbine wheel 111, etc.

It will be appreciated that the turbocharger system 100 and the valve assembly 200 may be arranged and configured differently from the embodiment of FIG. 1. Moreover, it will be appreciated that FIG. 1 schematically illustrates the turbocharger system 100, the valve assembly 200, the IC engine 125, and other components. Therefore, these components are not necessarily drawn to scale.

Referring now to FIGS. 2-6, the valve assembly 200 will be discussed according to example embodiments. As stated above, the valve assembly 200 may generally include the poppet 202 and the actuating arm 204.

Figure 4:
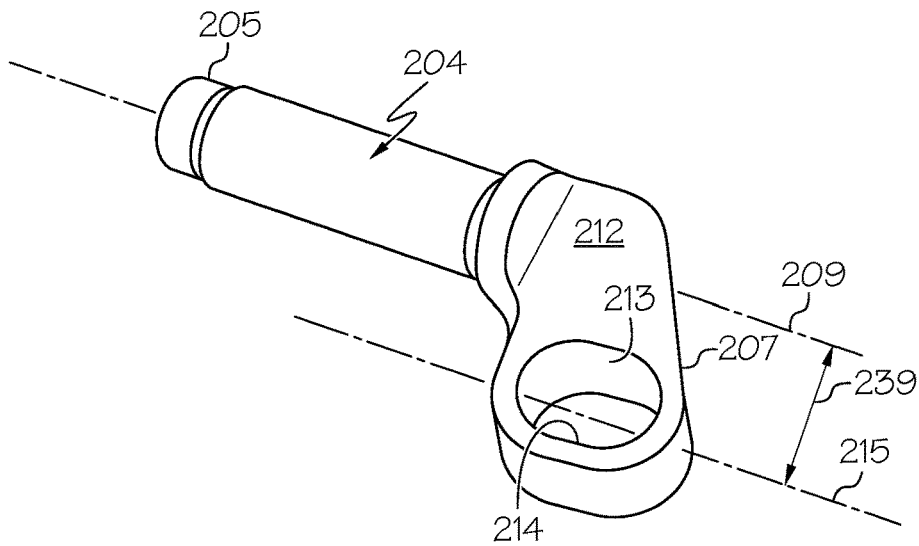
FIG. 4 is a perspective view of an arm of the wastegate valve assembly of FIG. 2.

As shown in FIG. 4, the actuating arm 204 may be an elongate rod. The arm 204 may be made of a stiff and strong material, such as stainless steel, aluminum alloy, or other metallic material. The actuating arm 204 may define a longitudinal axis 209 that extends between a first end 205 and an opposing second end 207. In some embodiments, the longitudinal axis 209 may be an axis of rotation for the valve assembly 200 as it moves between the closed position and the open position relative to the valve seat 180 (FIG. 1). The first end 205 of the arm 204 may be attached to the actuator 206 in some embodiments. In other embodiments, there may be an intervening rod, gear train, or other member configured for operatively attaching the arm 204 to the actuator 206.

The actuating arm 204 may also include a head 212 that is supported at the second end 207 of the arm 204. The head 212 may be block-shaped and may extend away at an angle from the axis 209. The head 212 may include an opening 214, such as a through-hole, slot, or other aperture. The opening 214 may be defined by a continuous inner surface 213. Also, the opening 214 may be ovate, elliptical, or otherwise elongated along a major axis 215. The major axis 215 of the opening 214 may be substantially aligned with the longitudinal axis 209 of the arm 204, but spaced at a distance 239 therefrom. In some embodiments, the major axis 215 may be substantially parallel to the longitudinal axis 209. In other embodiments, the major axis 215 may be disposed at a slight angle (e.g., at most +/− ten degrees) relative to the longitudinal axis 209.

Figure 2:
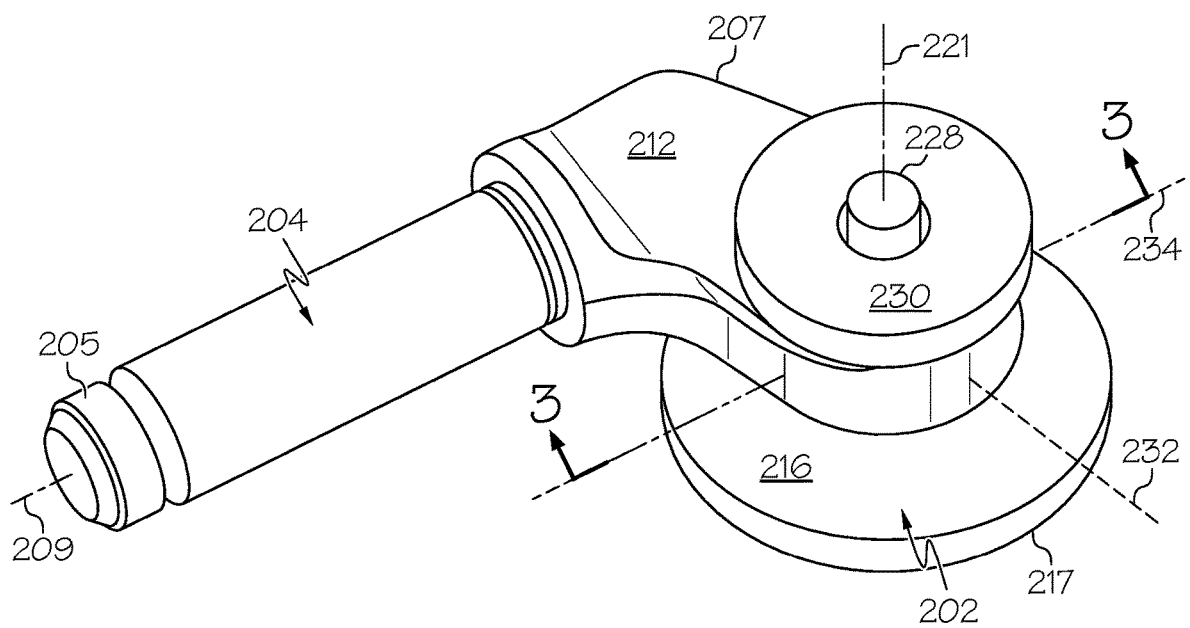
FIG. 2 is a perspective view of a wastegate valve assembly of the turbocharger system of FIG. 1 according to example embodiments of the present disclosure.
Figure 3:
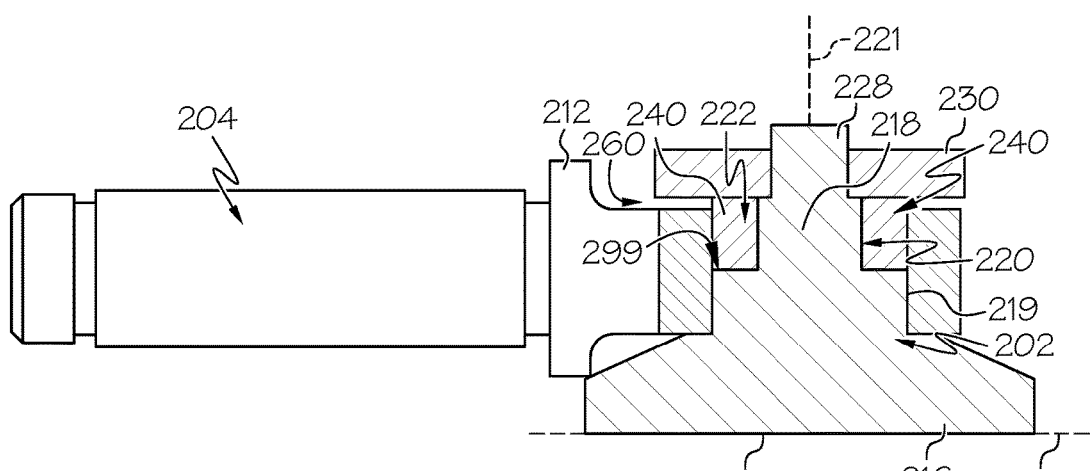
FIG. 3 is a section view of the wastegate valve assembly taken along the line 3-3 of FIG. 2.
Figure 5:
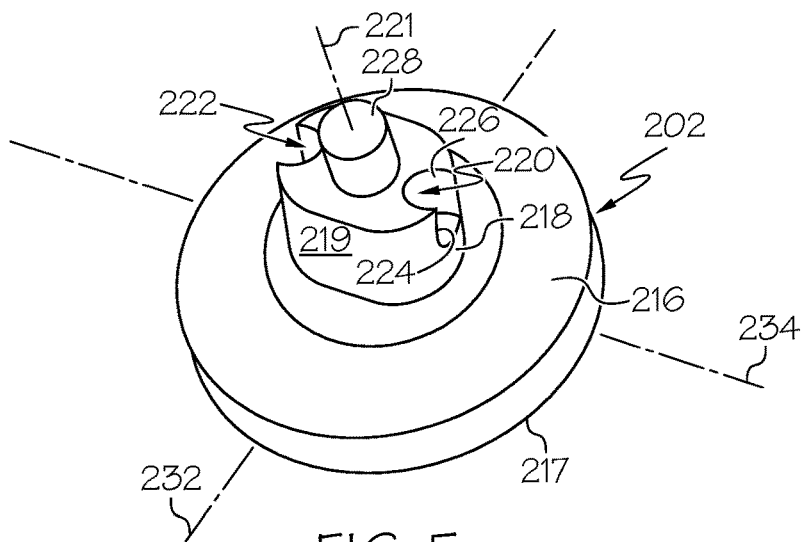
FIG. 5 is a perspective view of a poppet of the wastegate valve assembly of FIG. 2.

As shown in FIGS. 2, 3, and 5, the poppet 202 may include a sealing disc 216. The sealing disc 216 may be rounded (e.g., circular) in some embodiments. The sealing disc 216 may include a sealing surface 217. The sealing surface 217 may be configured for substantially sealing against the valve seat 208 when the poppet 202 is in the closed position. The poppet 202 may further include a mandrel 218 that projects from the sealing disc 216 along a central axis 221. The mandrel 218 may be defined by an outer peripheral surface 219. The mandrel 218 may be shaped according to the shape of the opening 214. Accordingly, the outer peripheral surface 219 may define an elongate projection that is received within the opening 214 of the actuating arm 204 (FIGS. 2 and 3). Stated differently, the mandrel 218 may be substantially ovate in a cross section taken perpendicular to the axis 221. The mandrel 218 and the opening 214 may be aligned along the major axis 215. Also, the arm 204 may be eccentric with respect to the axis 221 of the mandrel 218.

Furthermore, the mandrel 218 may include a plurality of apertures, such as a first pocket 220 and a second pocket 222. The first and second pockets 220, 222 may be somewhat cylindrical pockets or recesses. The pockets 220, 222 may both include a respective radial opening 224 where a radially-facing portion of the outer peripheral surface 219 is interrupted. The pockets 220, 222 may also include a respective axial opening 226 where the top axial face of the mandrel 218 is recessed along the axis 221.

The pockets 220, 222 may be spaced apart radially from the axis 221. The pockets 220, 222 may be spaced apart equally from the axis 221 along the major axis 215. Also, the pockets 220, 222 may be spaced substantially equally about the axis (e.g., one hundred and eighty degrees apart) in a circumferential direction. The pockets 220, 222 may be arranged at the elongate ends of the mandrel 218. Also, the radial openings 224 may face in opposite directions from each other along the 215.

Thus, the mandrel 218 may be centered and may define at least two lines of symmetry. The lines of symmetry may extend radially away from the axis 221. In the embodiment shown, the mandrel 218 may include a first line of symmetry 232, which may be substantially coaxial with the major axis 215 and which may extend through the center of the pockets 220, 222. The mandrel 218 may also include a second line of symmetry 234, which is perpendicular to the first line of symmetry 232.

Furthermore, the poppet 202 may include a projection 228. The projection 228 may be rounded and may be substantially centered on the axis 221.

In some embodiments, the poppet 202 may be at least partly made of stainless steel or other metal material. Also, in some embodiments, at least part of the sealing disc 216, the mandrel 218, and the projection 228 may be constructed from a unitary, one-piece body. In some embodiments, the sealing surface 217 may include a separate and replaceable seal.

In addition, the wastegate valve assembly 200 may include a retainer cap 230 (FIGS. 2 and 3). The retainer cap 230 may be a substantially flat and disc-shaped washer in some embodiments. The retainer cap 230 may receive the projection 228 and may be fixed thereon. The assembly may also include an additional or an alternative fastener or fastening body that is attached to the projection 228. Accordingly, the poppet 202 may be retained on the arm 204 with the head 212 of the arm 204 being retained between the sealing disc 216 and the retainer cap 230.

Figure 6:
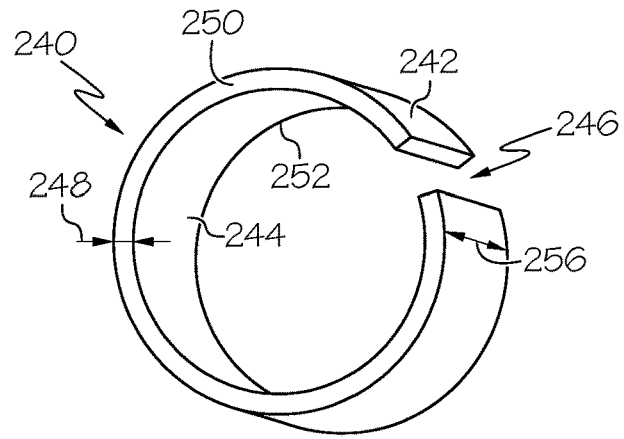
FIG. 6 is a perspective view of a biasing member of the wastegate valve assembly of FIG. 2.

Furthermore, as shown in FIGS. 3 and 6, the valve assembly 200 may include at least one biasing member 240. In the illustrated embodiment, there are two biasing members 240 in the valve assembly 200; however, it will be appreciated that the valve assembly 200 may include any suitable number of biasing members 240 without departing from the scope of the present disclosure.

An example embodiment of the biasing member 240 is shown in FIG. 6. As shown, the biasing member 240 may be a C-spring in some embodiments. Accordingly, the biasing member 240 may include a rounded or arcuate outer diameter surface 242 and an opposing inner diameter surface 244.

These surfaces may be interrupted by a gap 246. The biasing member 240 may have a wall thickness 248 measured between the outer diameter surface 242 and the inner diameter surface 244. Also, the biasing member 240 may be cylindrical and may have an upper end 250 and an opposite lower end 252. A length 256 of the biasing member 240 may be measured between the upper end 250 and the lower end 252.

The biasing member 240 may be flexible and resilient in a circumferential direction. As such, the biasing member 240 may flex to vary the size of the gap 246. In some embodiments, the biasing member 240 may be configured as a compression spring such that a force directed radially inward may flex the biasing member 240 and reduce the size of the gap 246. Then, when the radial force is removed, the biasing member 240 may rebound to a neutral position, and the gap 246 may return to a predetermined size.

The biasing members 240 may be attached to the poppet 202 in some embodiments. For example, as shown in FIG. 3, one of the biasing members 240 may be received within the first pocket 220, and another of the biasing members 240 may be received within the second pocket 222. Specifically, the upper end 250 may face along the axis 221 toward the retainer cap 210. The outer diameter surface 242 may face outward radially from the axis 221, and a portion of the outer diameter surface 242 may be exposed via the radial opening 224.

As discussed above, the pockets 220, 222 may be substantially symmetrically arranged, at least, with respect to the first line of symmetry 232 and the second line of symmetry 234. Thus, the biasing members 240 may be arranged substantially symmetrically with respect to the first and second lines of symmetry 232, 234. Likewise, the biasing members 240 may be spaced substantially evenly about the axis 221 in the circumferential direction. Moreover, the major axis 215 may intersect both biasing members 240, and the biasing members 240 may be spaced substantially equally from the axis 221 in the radial direction.

As shown in FIG. 3, the biasing members 240 may abut against and may frictionally engage the poppet 202, for example, against the interior surfaces of the respective pocket 220, 222. Also, the portion of the biasing member 240 that is exposed through the radial openings 224 may abut against and may frictionally engage the inner surface 213 of the arm 204. Furthermore, other portions of the inner surface 213 may abut against and may frictionally engage the mandrel 218.

Accordingly, as shown in FIG. 3, the biasing members 240 may be disposed within a joint 299 between the head 212 of the actuating arm 204 and the mandrel 218 of the poppet 202. The head 212 may grip the mandrel 218 and flex the biasing members 240 radially inward toward the axis 221. The biasing members 240 may react by exerting a biasing force that is directed radially through the joint 299. The biasing members 240 may exert this radial force against the mandrel 218 as well as the inner surface 213 of the head 212. Accordingly, the biasing members 240 may apply a predetermined amount of biasing force and, thus, a predetermined amount of friction for holding the poppet 202 to the arm 204. The frictional engagement may substantially prevent uncontrolled vibration, rattling, or other noise between the poppet 202 and the head 212 of the arm 204.

Furthermore, the joint 299 may include an axial gap 260 (measured along the axis 221) and at least one of the sealing disc 216 and the retainer cap 230. In some embodiments, there may be a similar axial gap 260 between the biasing members 240 and at least one of the interior surface of the pocket 220, 222 and the retainer cap 230.

Thus, the arm 204 and the poppet 202 may be securely attached at the joint 299. However, the biasing members 240 may allow some degree of movement of the poppet 202 relative to head 212 of the arm 204. Specifically, the valve assembly 200 may allow a small degree of axial movement of the poppet 202 relative to the arm 204 along the axis 221. The valve assembly 200 may also allow a small degree of radial movement of the poppet 202 relative to the arm 204. As such, the biasing members 240 may allow the poppet 202 to change position relative to the arm 204, for example, to adapt to the different operating conditions of the turbocharger system 100 and maintain high operating efficiency. For example, the poppet 202 may self-adjust relative to the arm 204 due to wear, due to thermal expansion, etc. Nevertheless, the biasing members 240 may ensure that the poppet 202 seals against the valve seat 208 of the wastegate 194 and prevents exhaust leakage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbocharger system comprising:
a turbine section with a turbine wheel;
a downstream exhaust pipe with a downstream exhaust passage configured to receive exhaust gas from the turbine section;
a wastegate with a bypass passage and a valve assembly configured to regulate flow through the bypass passage, the valve assembly including:
a poppet with a plurality of pockets spaced apart circumferentially about an axis, the pockets having a respective radial opening that is directed outward from the axis and a respective axial opening that is directed along the axis, the poppet configured to move between a closed position and an open position, the poppet configured to substantially close the bypass passage when in the closed position, the poppet configured to open the bypass passage when in the open position and allow exhaust gas to flow to the downstream exhaust passage;
an arm that is attached to the poppet and that supports movement of the poppet between the closed position and the open position; and
a plurality of biasing members that respectively include an outer diameter surface, the plurality of biasing members being resiliently compressible between a neutral position and a compressed position, the plurality of biasing members removably disposed within respective ones of the plurality of pockets in the compressed position with one part of the outer diameter surface frictionally engaging the poppet and another part of the outer diameter surface exposed via the respective radial opening for frictionally engaging the arm, the plurality of biasing members providing a biasing force directed in a radial direction relative to the axis, the plurality of biasing members being disposed substantially symmetrically with respect to a first radial line of symmetry and a second radial line of symmetry.

2. The turbocharger system of claim 1, wherein the plurality of biasing members includes a first biasing member and a second biasing member that are disposed on opposite sides of the axis;
wherein the first radial line of symmetry intersects both the first biasing member and the second biasing member; and
wherein the second radial line of symmetry is perpendicular to the first radial line of symmetry.

3. The turbocharger system of claim 2, wherein the arm has a longitudinal axis;
wherein the first radial line of symmetry is substantially parallel to the longitudinal axis of the arm.

4. The turbocharger system of claim 1, wherein the plurality of biasing members are a plurality of C-springs.

5. The turbocharger system of claim 1, wherein the poppet includes a mandrel; and
wherein the arm includes an aperture that receives the mandrel.

6. The turbocharger system of claim 5, wherein the mandrel and the aperture are elongate along the first line of symmetry.

7. The turbocharger system of claim 5, wherein the poppet includes a sealing disc;
further comprising a retainer cap that is fixed to the mandrel to retain the arm between the sealing disc and the retainer cap, the retainer cap covering over the axial openings of the plurality of pockets and the plurality of biasing members respectively disposed therein; and
wherein an axial gap is defined between the arm and at least one of the retainer cap and the sealing disc.

8. The turbocharger system of claim 1, wherein the arm is eccentric with respect to the axis.

9. A turbocharger system comprising:
a turbine section with a turbine wheel;
a downstream exhaust pipe with a downstream exhaust passage configured to receive exhaust gas from the turbine section;
a wastegate with a bypass passage and a valve assembly configured to regulate flow through the bypass passage, the valve assembly including:
a poppet with a plurality of pockets spaced apart evenly in a circumferential direction about an axis, the pockets having a respective radial opening that is directed outward from the axis and a respective axial opening that is directed along the axis, the poppet configured to move between a closed position and an open position, the poppet configured to substantially close the bypass passage when in the closed position, the poppet configured to open the bypass passage when in the open position and allow exhaust gas to flow to the downstream exhaust passage;
an arm that is attached to the poppet and that supports movement of the poppet between the closed position and the open position; and
a plurality of biasing members that respectively include an outer diameter surface, the plurality of biasing members being resiliently compressible between a neutral position and a compressed position, the plurality of biasing members removably disposed within respective ones of the plurality of pockets in the compressed position with one part of the outer diameter surface frictionally engaging the poppet and another part of the outer diameter surface exposed via the respective radial opening for frictionally engaging the arm, the plurality of biasing members providing a biasing force to the arm that is directed in a radial direction relative to the axis, the plurality of biasing members being spaced substantially evenly in the circumferential direction about the axis.

10. The turbocharger system of claim 9, wherein the poppet includes a mandrel that includes the plurality of pockets;
wherein the arm frictionally engages the mandrel and the respective outer diameter surface of the plurality of biasing members.

11. The turbocharger system of claim 10, wherein the mandrel is elongate along a major axis that extends radially from the axis.

12. The turbocharger system of claim 11, wherein the major axis intersects the plurality of biasing members.

13. The turbocharger system of claim 11, wherein the mandrel and the plurality of pockets are substantially symmetric with respect to at least two lines of symmetry.

14. The turbocharger system of claim 9, wherein the plurality of biasing members are a plurality of C-springs.

15. The turbocharger system of claim 9, wherein the poppet includes a sealing disc;
further comprising a retainer cap that is fixed to the poppet to retain the arm between the sealing disc and the retainer cap, the retainer cap covering over the axial openings of the plurality of pockets and the plurality of biasing members respectively disposed therein; and
wherein an axial gap is defined between the arm and at least one of the retainer cap and the sealing disc.

16. The turbocharger system of claim 9, wherein the arm is eccentric with respect to the axis.

17. A turbocharger system comprising:
a turbine section with a turbine wheel;
a downstream exhaust pipe with a downstream exhaust passage configured to receive exhaust gas from the turbine section;
a wastegate with a bypass passage and a valve assembly configured to regulate flow through the bypass passage, the valve assembly including:
a poppet configured to move between a closed position and an open position, the poppet configured to substantially close the bypass passage when in the closed position, the poppet configured to open the bypass passage when in the open position and allow exhaust gas to flow to the downstream exhaust passage, the poppet having an axis, the poppet including a sealing disc, the poppet including a mandrel with a first pocket with a first radial opening that interrupts a peripheral surface of the poppet and a first axial opening that is directed along the axis, the mandrel including a second pocket with a second radial opening that interrupts the peripheral surface of the poppet and a second axial opening that is directed along the axis, the first pocket and the second pocket spaced apart substantially evenly circumferentially about the axis;
an arm with an arm axis and a head that receives the mandrel and that frictionally engages the mandrel, the arm supporting rotational movement of the poppet about the arm axis between the closed position and the open position; and a first biasing member and a second biasing member that are resiliently compressible between a neutral position and a compressed position, the first biasing member removably disposed in the first pocket in the compressed position with part of a first outer diameter surface of the first biasing member frictionally fit against the mandrel and another part of the first outer diameter surface exposed via the first radial opening to frictionally engage the arm and provide a biasing force to the arm that is directed in a first radial direction relative to the axis, the second biasing member removably disposed in the second pocket in the compressed position with part of a second outer diameter surface of the second biasing member frictionally fit against the mandrel and another part of the second outer diameter surface exposed via the second radial opening to frictionally engage the arm and provide a biasing force to the arm that is directed in a second radial direction relative to the axis, the first biasing member and the second biasing member being disposed substantially symmetrically with respect to a first radial line of symmetry and a second radial line of symmetry, the first radial line of symmetry being perpendicular to the second radial line of symmetry; and a retainer cap that is fixed to the mandrel to retain the arm between the sealing disc and the retainer cap, the retainer cap covering over the first axial opening and the first biasing member disposed within the first pocket, the retainer cap covering over the second axial opening and the second biasing member disposed within the second pocket.

* * * * *